Aug. 21, 1973     R. A. DUFF     3,753,849

CEMENTATIOUS MATERIAL AND CONSTRUCTIONS MADE THEREFROM

Filed March 11, 1971

INVENTOR.
RAYMOND A. DUFF
BY
Dean Sandford
ATTORNEY

United States Patent Office 3,753,849
Patented Aug. 21, 1973

3,753,849
CEMENTATIOUS MATERIAL AND CONSTRUC-
TIONS MADE THEREFROM
Raymond A. Duff, 1333 S. Baker,
Santa Ana, Calif. 92707
Continuation-in-part of application Ser. No. 851,960,
Aug. 21, 1969, now abandoned. This application
Mar. 11, 1971, Ser. No. 123,221
Int. Cl. B32b 17/10, 27/38; C04 7/12
U.S. Cl. 161—162                                18 Claims

ABSTRACT OF THE DISCLOSURE

A cementatious material of construction comprised of an admixture of hydraulic cement, aggregate, epoxy resin, water reducing additive, and sufficient water to harden the cement. Also disclosed are reinforced concrete constructions formed of alternate integrally bonded layers of the cementatious material and fiber-reinforced epoxy resin, and a method for manufacturing laminated concrete and fiber-reinforced epoxy resin constructions. The constructions can have a resinous surface coating integrally bonded thereto to enhance the appearance and serviceability of the construction.

---

This is a continuation-in-part of application Ser. No. 851,960 filed Aug. 21, 1969, now abandoned.

This invention relates to cementatious materials of construction and to reinforced concrete constructions made therefrom, and more particularly to relatively thin, laminated articles of construction and to methods for their manufacture.

Because of its relatively low cost, durability, high compressive strength, and availability, reinforced concrete has been widely used as a material of construction. However, since concrete has relatively low tensile and flexural strengths, it has not been practical to construct relatively thin, high strength articles of concrete, or to construct panels, sheets and similar constructions of concrete. On the contrary, reinforced concrete has been largely limited to use in constructions where weight and bulk are not limiting factors. Various resin and fiber-reinforced resin systems, such as glass fiber reinforced polyester resin, and the like, have been widely employed to construct a variety of relatively light weight molded and formed articles. These resin constructions are favored for their low weight, ease of fabrication and decorative effect. However, they are subject generally to high cost, flammability, low strength, and limited service life at elevated temperatures or when exposed to light, particularly ultraviolet light. Thus, need exists for a relatively low cost, durable, high strength material of construction that is easy to form and exhibits good thermal properties, and that has a decorative, serviceable finish.

Accordingly, a principal object of this invention is to provide relatively thin concrete constructions having high strength and durability.

Another object of this invention is to provide a novel cementatious material useful in forming durable, high strength articles.

Yet another object of this invention is to provide concrete articles of construction having high strength and durability.

Still another object of this invention is to provide concrete sheet and panel constructions.

A further object of this invention is to provide specially shaped articles of construction having high strength and durability.

A still further object of this invention is to provide concrete constructions having a resinous decorative finish.

An even further object of this invention is to provide a method for manufacturing relatively thin concrete constructions having high strength and durability.

A yet further object of this invention is to provide a method for manufacturing concrete sheet and panel constructions having high strength and durability.

The manner in which the foregoing and other objects of this invention are realized will be apparent to those skilled in the art from the following disclosure and accompanying drawings, in which.

Briefly, the invention contemplates a novel cementatious material of construction comprised of hydraulic cement, aggregate, epoxy resin, water reducing additive, and sufficient water to hydrate the cement. This invention also contemplates reinforced concrete constructions comprised of a plurality of alternate, integrally bonded layers of cementatious material and fiber-reinforced epoxy resin, and a method for making concrete and fiber-reinforced epoxy resin constructions. These constructions are comprised of a plurality of layers of the cementatious material with intermediate layers of fiber-reinforced epoxy resin integrally bonded between adjacent layers of the cementatious material. Also, the constructions of this invention can have an integrally bonded resinous surface coating to enhance the appearance and serviceability of the construction.

Figure 1:
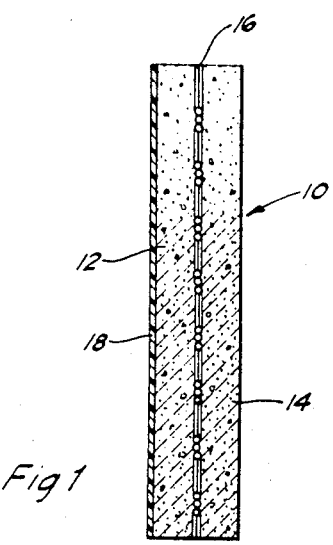
FIG. 1 is a cross-sectional view of a construction of this invention.

Referring more specifically to FIG. 1 of the drawings, the numeral 10 designates a construction such as a flat sheet or panel of relatively thin construction. The construction is a laminated structure comprised of two layers of cementatious material 12 and 14 and an inner layer 16 of fiber-reinforced epoxy resin bonding the cementatious material into an integral unitary structure having high strength and durability. An outer resinous surface coating 18 can optionally be integrally bonded to the cementatious material. The finished construction can vary from about ⅛-inch to several inches or more in thickness; however, an overall thickness of about ¼-inch to about 2-inches or more is preferred in many applications, with thicknesses of from about ¼-inch to 1-inch being especially preferred.

Figure 2:
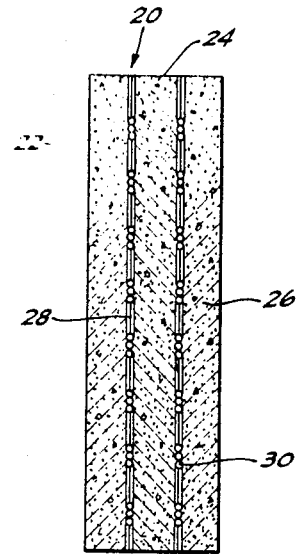
FIG. 2 is a cross-sectional view of another embodiment of a construction of this invention.

FIG. 2 illustrates a construction 20 formed of a plurality of layers of cementatious material with intermediate layers of fiber-reinforced epoxy resin integrally bonded between layers of cementatious material to provide a unitary structure. In the illustrated embodiment, the integral structure is formed of three layers of cementatious material 22, 24 and 26, with a layer of fiber-reinforced epoxy resin 28 interposed between adjacent layers of cementatious material 22 and 24, and a layer of fiber-reinforced epoxy resin 30 interposed between adjacent layers of cementatious material 24 and 26. With this mode of construction, a member can be formed with as many alternate layers of cementatious material and fiber-reinforced epoxy resin as desired. Constructions having substantial thickness and exhibiting great strength can be formed in this manner.

The cementatious material used in the constructions of this invention is a hardenable admixture of hydraulic cement, aggregate, epoxy resin, water reducing additive, and sufficient water to hydrate the cement. When first admixed, the material has a soft, semisolid consistency and can be molded, cast, trowelled, or applied by gun. On curing, the material hardens into a hard rigid solid having high strength and durability.

The hydraulic cement can be any of the commercial hydraulic cements such as ASTM Type I or normal portland cement, ASTM Type II or modified portland cement, ASTM Type III or high-early-strength portland cement, ASTM Type IV or low-heat portland cement, ASTM Type V or sulphate resistant portland cement, ASTM Type IP or portland-pozzolana cement, plastic cement, or gun plastic cement. Also, the cement can optionally contain additives to improve various properties, such as workability, aggregate segregation, air entrainment, and to accelerate or slow setting time. The aggregate is sand, although fine pea gravel and crushed aggregate can be used in part, particularly in thicker constructions, and lightweight or low density aggregate can be employed where it is desired to minimize weight.

Various commercial epoxy resin compositions can be employed in the practice of this invention. These are typically undiluted low viscosity liquids or more viscous resins diluted with a solvent, and are conventionally employed in a two component system, i.e., the resin and the catalyst are separately packaged and admixed only at the time of use. The epoxy resins preferred in the practice of this invention are undiluted liquids that exhibit the following properties after curing for seven days:

Tensile strength: 8,000 p.s.i. minimum
Tensile elongation: 10 percent maximum
Flexural strength: 15,000 p.s.i. minimum
Compressive yield: 12,000 p.s.i. minimum
Hardness: above 60 shore D.

A commercial epoxy resin exhibiting the foregoing properties and which is particularly useful in the practice of this invention is a relatively low viscosity, two component epoxy resin marketed by the Adhesive Engineering Company under the trademark Concresive #1170, and identified as Part A and Part B. This material is admixed in the ratio of about 2 parts of Part A to 3 parts of Part B to about 3 parts of Part A to 2 parts of Part B, and is preferably employed in the proportion of about equal parts of Part A and Part B. Preferably, the two epoxy resin components are intimately admixed prior to adding them to the wet cement mixture.

A suitable epoxy resin is the diglycidyl ether of bisphenol A which can be formed by the condensation of epichlorohydrin and bisphenol A, i.e., bis(4-hydroxyphenyl)dimethyl methane. A preferred bisphenol A diglycidyl ether is a liquid thermosetting resin having a Brookfield viscosity of about 10,000 to 16,000 centipoises at a temperature of 25° C. and an epoxide equivalent weight of about 185 to 200. A suitable bisphenol A diglycidyl ether of this type is marketed by the Celanese Coatings Company under the trademark Epi-Rez 510.

The bisphenol A diglycidyl ether can be admixed with a reactive diluent to provide a modified resin system. A preferred epoxy resin is an admixture of bisphenol A diglycidyl ether and ortho-cresyl glycidyl ether containing about 20 to 40 percent of the reactive diluent. A particularly preferred resin combination is an admixture of about 73 parts of bisphenol A diglycidyl ether and 27 parts of ortho-cresyl glycidyl ether. A suitable ortho-cresyl glycidyl ether reactive diluent having a Brookfield viscosity of 5 to 25 centipoises at 25° C. and an epoxide equivalent weight of 180 to 200 is marketed by the Celanese Coatings Company under the trademark Epi-Rez 5011. A commercially available admixture of 73 percent diglycidyl ether of bisphenol A and 27 percent ortho-cresyl glycidyl ether suitable for use in the compositions of this invention is marketed by the Celanese Coatings Company under the trademark Epi-Rez 5077. This resin mixture has a Brookfield viscosity of 500 to 700 centipoises at 25° C. and an epoxide equivalent weight of 185 to 200.

A wide variety of catalysts and reactive hardeners are known that cure or harden epoxy resins. While a number of different agents can be employed to cure the epoxy resins employed in the compositions of this invention, the reactive amine-type hardeners are preferred. A particularly preferred hardener is an admixture of a reactive amido-amine such as dicyandiamide and a highly reactive modified amine converter. A suitable hardening agent of this type is marketed by the Celanese Coatings Company under the trademark Epi-Cure 872. The preferred hardening agent is added to the epoxy resin in the proportions of about 0.3 to 1 part of hardening agent per part of resin, and preferably in the proportion of about 0.5 of hardener per part of resin.

The water reducing additive employed in the composition of this invention is a liquid admixture consisting principally of hydroxylated polymers, calcium lignosulfonate, and an organic accelerator. A suitable water reducing agent is marketed by Master Builders under the trademark Pozzolith 300–N. The liquid water reducing additive is employed in small amounts, such as in the proportion of about 1 to 6 fluid ounces per 94 pound sack of cement, and preferably in the proportion of about 2 to 4 fluid ounces per sack of cement.

The cementatious compositions of this invention are prepared by admixing the ingredients in the proportion of about ¼ to 3, and preferably about ¼ to 1½ gallons of combined epoxy resin and hardener, about 1 to 3 cubic feet of aggregate, about 1 to 6 fluid ounces of liquid water reducing additive, and about 4 to 6, and preferably about 4½ to 5 gallons of water per 94 pound sack of cement. A preferred composition comprises an admixture of about ¾ gallon of epoxy resin and hardener, about 2 cubic feet of aggregate, about 3 fluid ounces of liquid water reducing additive, and about 4 to 6 gallons of water per 94 pounds sack of cement, the exact amount of water depending upon the moisture content of the sand. The aggregate content of this composition on a weight basis is about 100 to 300 pounds, and preferably about 200 pounds per 94 pound sack of cement when using regular sand, and about 55 to 165 pounds per sack when using light weight aggregates. The amounts of water employed in the cementatious compositions of this invention has been found to be substantially less than would be required to hydrate and cure conventional concrete.

Also, it has been found that the cementatious compositions of this invention cure or harden substantially faster than conventional concrete, curing often being sufficiently complete in only a few hours at ambient temperature to permit an article to be removed from a mold or subjected to a moderate amount of handling, although several days will be required for the material to reach substantially full strength.

The compositions of this invention are preferably prepared by admixing the water and the water reducing additive, then adding the cement and mixing the mass to a uniform consistency. Next, the aggregate is added and thoroughly mixed. The epoxy resin and the hardener is premixed and, as a final step, thoroughly mixed into the cementatious composition. It should be noted that no more water can be added to cementatious mixture after the resin has been added. Any adjustment of moisture content must be done before addition of the resin. Also, in an alternative mode of preparation, the water reducing additive can be premixed with the epoxy resin and hardener, and this admixture added to the wet cement.

The laminated concrete constructions of this invention can have a wide variety of shapes and sizes depending upon the ultimate use of the construction. These constructions can be in the form of sheets, panels, posts, beams, girders, structural shapes, cylindrical or other shaped enclosed vesels, pipes, closed or open conduits, and the like. Also, the constructions can be in the form of urns, vases, containers, large bowls, dishes, statues, and similar art or utilitarian objects and constructions having unusual shapes can be easily formed. The cementatious material is useful in fabricating plumbing fixtures such as sinks, lavatory basins, laundry tubs, water closets, urinals, bathtubs, and stall shower and bathtub enclosures. Also, the cementatious material is useful in the construction of counter and drain board tops useful in bathrooms, kitchens, laboratories and industrial installations.

The exterior surfaces of the construction of this invention can be left unfinished, or all or a portion of the surfaces can be provided with one or more coats of a suitable paint. A particularly durable finish is provided by coating the exterior surfaces of the concrete with epoxy paint.

Also, the constructions can optionally be provided with a resinous surface coating integrally bonded to the construction to provide a decorative and/or serviceable outer surface. Various clear or pigmented resins such as polyester and epoxy resins are suitable for use in this application.

The constructions of this invention are manufactured by casting the cementatious material in the uncured state in a suitable form, or by applying the material to a suitably shaped mold. The wet or uncured cementatious material is then hardened by curing, and the hardened member removed from the form or mold.

Figure 3:
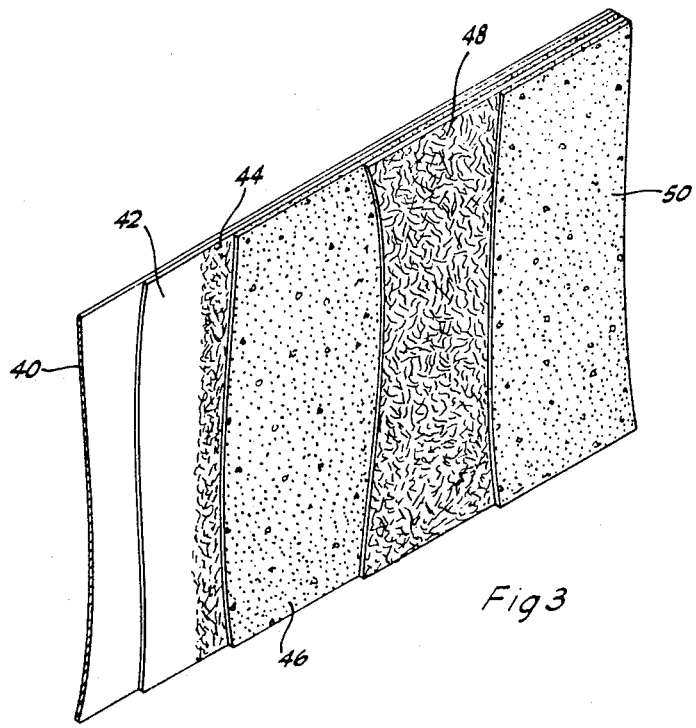
FIG. 3 is a perspective view illustrating the method of manufacturing the reinforced concrete constructions of this invention.

FIG. 3 illustrates the manufacture of a construction of this invention by a technique particularly useful in forming relatively thin sections. Mold 40 can be a male or female mold of any desired configuration and surface pattern. The mold can be coated with a suitable concrete form release, mold release or separating compound to facilitate removal of the completed article from the mold. As illustrated in FIG. 3, a first relatively thin layer 42 of polyester or epoxy gel coat is applied to the mold by spray or hand application. This layer of gel coat ultimately forms the surface coating of the construction. The gel coat reproduces the mold surface exactly to form a mirror image of the mold on the surface of the construction. In this manner, any form of surface from a smooth, porcelain-like finish to a grained textured pattern can be obtained.

When the gel coat has cured or hardened to at least a tacky consistency, layer 44 of reinforcing fibers, such as chopped glass fibers, and epoxy resin is applied directly over the gel coat. The epoxy resin can be the same resin-hardener added to the cementatious composition. Fiber-reinforced epoxy resin layer 44 can be formed by presaturating the fibers with epoxy resin and applying the epoxy resin saturated fibers to the previously applied gel coat. Alternatively, fiber reinforcing material can be applied to the previously applied gel coat, and the epoxy resin then applied by brushing, rolling or spraying. Where chopped fibers are employed, it is convenient to apply the fibers with a chopper gun that simultaneously blows the chopped fibers and sprays the epoxy resin and hardener onto the surface to be coated.

A relatively thin layer 46 of the cementatious material of this invention is applied over fiber-reinforced epoxy resin layer 44. The uncured cementatious material can be readily applied by trowelling, or with a low pressure plaster gun. Next, the layer 48 of epoxy resin saturated fibers is applied, and thereafter, the layer 50 of uncured cementatious material is applied. If desired, additional layers of epoxy saturated fibers and cured cementatious material can be applied to obtain a structure having the desired number of laminations. The final layer of uncured cementatious material can be finished in any conventional manner to provide the desired finish, such as by trowelling, floating, rubber floating, brooming, and the like, or it can be left unfinished. It is sometimes preferable to apply a light coat of epoxy resin over this final layer to act as a sealer and to inhibit crazing of the cementatious material.

The fiber reinforcing material for the epoxy resin layer can be metal, plastic, cloth, or fiber glass in the form of matting, woven material, or short lengths of chopped fibers. Other fibers that can be employed in addition to fiber glass are sisal, hemp, cotton, nylon, rayon, polyethylene terephthalate (Dacron) acrylic fibers (Orlon), and other synthetic and natural fibers. Included within the woven materials are metal, plastic, cloth or glass screen or mesh. A particularly preferred fiber reinforcing material that imparts superior strength to the ultimate structure is woven fiber glass roving. Fiber glass roving is a woven-type material in which bundles of glass fibers are woven in a basket-like weave.

Tile, counter tops, panels, and like constructions formed of the cementatious material of this invention can be finished to have the appearance of simulated marble. In this embodiment of the invention, the constructions are preferably cast in forms. The marbleized surface layer consists of an admixture of about 2 parts by weight of finely ground calcium carbonate per part of clear polyester or epoxy gel coat. Pigments such as titanium dioxide, carbon black, and various paint pigments can be incorporated into the gel to provide a swirl or streak effect. The gel is placed in the form to a thickness of about 1/16 to 1/4-inch, and preferably about 3/32 to 1/8-inch, and alternate layers of cementatious material and fiber-reinforced epoxy resin applied in the manner hereinabove described. The finished article constructed in this manner has an attractive marble-like appearance. In a modification of this embodiment, a clear polyester resin can first be applied to the form prior to placing the calcium carbonate-resin mixture in the form. Constructions produced in this manner in a smooth form will have a smooth, mirror-like surface having the appearance of marble.

After the web cement mixture and epoxy resin have set sufficiently that the structure has sufficient strength to be handled, the structure can be removed from the mold. Water or air under pressure can be injected between the construction and the mold to free the construction from the mold. The water or air can be injected through a suitable hose connection in the mold.

While various embodiments of the invention have been described, it will be obvious to those skilled in the art that it is not so limited, but is susceptible of various changes and modifications, which are considered within the spirit and scope of the invention as defined by the attached claims.

Having now described my invention, I claim:

1. A construction comprising alternate, integrally bonded layer of (1) a cementatious material comprised of an admixture of hydraulic cement, aggregate selected from the group consisting of sand and lightweight aggregates, epoxy resin, water reducing additive, and sufficient water to harden the cement, and (2) fiber-reinforced epoxy resin.

2. The article defined in claim 1 wherein said cementatious material is in the proportion of 1 to 3 cubic feet of aggregate, 1/4 to 3 gallons of epoxy resin, 1 to 6 fluid ounces of water reducing additive and about 4 to 6 gallons of water per 94 pound sack of cement.

3. The article defined in claim 1 wherein said fiber-reinforced epoxy resin is epoxy resin reinforced with metal, plastic or glass fibers.

4. The article defined in claim 1 wherein said construction is comprised of a plurality of layers of cementatious material having an integrally bonded layer of fiber-reinforced epoxy resin interposed between adjacent layers of said cementatious material.

5. The article defined in claim 1 wherein said construction is comprised of two layers of cementatious material and a layer of fiber-reinforced epoxy resin therebetween.

6. The article defined in claim 1 wherein said epoxy resin is an admixture of diglycidyl ether of bisphenol A and a reactive hardener.

7. The article defined in claim 1 wherein said epoxy resin is an admixture of diglycidyl ether of bisphenol A, ortho-cresyl glycidyl ether and a reactive hardener.

8. The article defined in claim 1 wherein at least a portion of its surface is coated with epoxy paint.

9. The article defined in claim 1 including an integrally bonded surface coating of polyester or epoxy gel coat.

10. A construction comprised of a relatively thin, laminated member formed of (1) at least one layer of a cementatious material comprised of an admixture of 1 to 3 cubic feet of aggregate selected from the group consisting of sand and lightweight aggregate, ¼ to 3 gallons of epoxy resin, 1 to 6 fluid ounces of a water reducing additive consisting essentially of an admixture of hydroxylated polymer, calcium lignosulfonate and an organic accelerator, and sufficient water to harden the cement per 94 pound sack of hydraulic cement; and (2) at least one integrally bonded layer of glass fiber reinforced epoxy resin.

11. The article defined in claim 10 wherein said construction is comprised of a plurality of layers of said cementatious material having an integrally bonded layer of fiber-reinforced epoxy resin interposed between adjacent layers of said cementatious material.

12. The article defined in claim 10 wherein said construction is comprised of two layers of cementatious material and a layer of fiber-reinforced epoxy resin therebetween.

13. The article defined in claim 10 wherein said epoxy resin is an admixture of diglycidyl ether of bisphenol A and a reactive hardener.

14. The article defined in claim 10 wherein said epoxy resin is an admixture of diglycidyl ether of bisphenol A, ortho-cresyl glycidyl ether and a reactive hardener.

15. The article defined in claim 10 including an integrally bonded surface coating of polyester or epoxy gel coat.

16. A relatively thin laminated construction comprised of a surface layer of polyester or epoxy gel coat and alternate integrally bonded layers of glass fiber reinforced epoxy resin and a cementatious material consisting of an admixture of 1 to 3 cubic feet of aggregate selected from the group consisting of sand and lightweight aggregate; ¼ to 3 gallons of epoxy resin comprising an admixture of diglycidyl ether of bisphenol A, orthocresyl glycidyl ether and reactive hardening agent; 1 to 6 fluid ounces of a water reducing additive comprised of an admixture of hydroxylated polymer, calcium lignosulfonate and an organic accelerator, and sufficient water to harden the cement per 94 pound sack of hydraulic cement.

17. The article defined in claim 16 wherein said cementatious material is an admixture of about 2 cubic feet of aggregate, ¼ to 1 gallon of said epoxy resin, 2 to 4 fluid ounces of said water reducing additive, and about 4 to 6 gallons of water per 94 pound sack of cement.

18. The article defined in claim 16 wherein said polyester or epoxy gel coat contains finely divided calcium carbonate to simulate the appearance of marble.

References Cited

UNITED STATES PATENTS

| | | | |
|---|---|---|---|
| 3,240,736 | 3/1966 | Beckwith | 106—90 X |
| 3,477,979 | 11/1969 | Hillyer | 106—90 X |
| 3,203,849 | 8/1965 | Katz et al. | 161—96 |
| 2,860,160 | 11/1958 | Sundberg et al. | 106—90 X |
| 3,198,758 | 8/1965 | Donnelly | 106—97 X |
| 3,344,011 | 9/1967 | Goozner | 161—184 X |
| 3,450,594 | 6/1969 | Hennessy | 161—184 |
| 3,475,265 | 10/1969 | Santry | 161—162 X |
| 3,634,169 | 1/1972 | Garnish | 161—185 X |
| 3,666,615 | 5/1972 | Iwai et al. | 161—185 |
| 3,674,533 | 7/1972 | Matsubara et al. | 161—162 X |

HAROLD ANSHER, Primary Examiner

U.S. Cl. X.R.

106—90, 97, 184, 185; 260—37 EP